United States Patent
Son et al.

(10) Patent No.: US 10,814,874 B2
(45) Date of Patent: Oct. 27, 2020

(54) APPARATUS AND METHOD FOR CONTROLLING CREEP TORQUE IN ENVIRONMENTALLY-FRIENDLY VEHICLE

(71) Applicants: HYUNDAI MOTOR COMPANY, Seoul (KR); KIA MOTORS CORPORATION, Seoul (KR)

(72) Inventors: Hui Un Son, Seoul (KR); Jin Kyeom Cho, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 174 days.

(21) Appl. No.: 15/832,673

(22) Filed: Dec. 5, 2017

(65) Prior Publication Data
US 2019/0111928 A1  Apr. 18, 2019

(30) Foreign Application Priority Data
Oct. 18, 2017  (KR) .......................... 10-2017-0135456

(51) Int. Cl.
B60W 30/18  (2012.01)
B60W 30/16  (2020.01)

(52) U.S. Cl.
CPC ...... *B60W 30/18063* (2013.01); *B60W 30/16* (2013.01); *B60W 2420/54* (2013.01); *B60W 2540/10* (2013.01); *B60W 2540/12* (2013.01); *B60W 2540/18* (2013.01); *B60W 2554/801* (2020.02); *B60W 2554/804* (2020.02)

(58) Field of Classification Search
None
See application file for complete search history.

(56) References Cited

U.S. PATENT DOCUMENTS

| | | | | |
|---|---|---|---|---|
| 2010/0089673 | A1* | 4/2010 | Wisniewski | B60K 6/365 180/65.285 |
| 2010/0152963 | A1* | 6/2010 | Heckel | B60W 30/17 701/29.2 |
| 2012/0303199 | A1* | 11/2012 | Oba | B60K 6/445 701/22 |
| 2013/0103235 | A1* | 4/2013 | Lee | B60W 10/08 701/22 |
| 2015/0266478 | A1* | 9/2015 | Takahashi | B60W 30/16 701/22 |
| 2016/0016469 | A1* | 1/2016 | Yamada | B60K 31/02 701/22 |

(Continued)

FOREIGN PATENT DOCUMENTS

KR  10-0892539 B1  4/2009
KR  10-2019-0043416 A  4/2019

*Primary Examiner* — Peter D Nolan
*Assistant Examiner* — Ce Li Li
(74) *Attorney, Agent, or Firm* — Mintz Levin Cohn Ferris Glovsky and Popeo, P.C.; Peter F. Corless

(57) ABSTRACT

The present disclosure relates to an apparatus and method for controlling a creep torque in an environmentally-friendly vehicle. The apparatus includes detectors that detect driving-related information of the vehicle and a controller that calculates rolling resistance based on the driving-related information and variably controls the creep torque in consideration of the calculated rolling resistance depending on whether the vehicle satisfies a creep cruise control operating condition.

14 Claims, 8 Drawing Sheets

(56) References Cited

U.S. PATENT DOCUMENTS

| | | | |
|---|---|---|---|
| 2016/0090006 A1* | 3/2016 | Yamazaki | B60L 15/2063 |
| | | | 701/22 |
| 2016/0264020 A1* | 9/2016 | Ochocinski | B60L 15/2063 |
| 2017/0144665 A1* | 5/2017 | Ohashi | F02D 29/02 |
| 2018/0099673 A1* | 4/2018 | Pedlar | B60W 10/06 |
| 2018/0370534 A1* | 12/2018 | Bemetz | B60W 30/18027 |
| 2019/0111928 A1 | 4/2019 | Son et al. | |

* cited by examiner $d_{detect} > d_{ref}$ : CREEP TORQUE CONTROL USING SPEED-COASTING TORQUE MAP $d_{detect} > d_{ref}$ : DISTANCE AND VEHICLE SPEED CONTROL, $d_{detect} \rightarrow d_{target}$, $v \rightarrow 0$ $$F_{creep} = \frac{-Mv_0^2}{2(d_{detect} - d_{target})} - F_{R.R.} - Mg\sin\theta$$

APPARATUS AND METHOD FOR CONTROLLING CREEP TORQUE IN ENVIRONMENTALLY-FRIENDLY VEHICLE

CROSS-REFERENCE TO RELATED APPLICATION

This application is based on and claims the benefit of priority to Korean Patent Application No. 10-2017-0135456, filed on Oct. 18, 2017, in the Korean Intellectual Property Office, the disclosure of which is incorporated herein in its entirety by reference.

TECHNICAL FIELD

The present disclosure relates to an apparatus and method for controlling a creep torque in an environmentally-friendly vehicle. More specifically, the present disclosure relates to a creep torque control apparatus and method for variably controlling a creep torque in an environmentally-friendly vehicle in consideration of rolling resistance of the vehicle.

BACKGROUND

In recent years, environmental issues have raised consumers' interest in environmentally-friendly vehicles, and studies on electric vehicles (EVs), hybrid electric vehicles (HEVs), plug-in hybrid electric vehicles (PHEVs), and the like have been increasingly conducted.

These environmentally-friendly vehicles do not generate creep development in which even though a driver does not depress an accelerator pedal in an automatic transmission vehicle having an internal combustion engine, when the driver releases a brake pedal, an idle torque of the engine is delivered to a torque converter so that the vehicle slowly accelerates.

The disclosure of this section is to provide background of the invention. Applicant notes that this section may contain information available before this application. However, by providing this section, Applicant does not admit that any information contained in this section constitutes prior art.

SUMMARY

As described above, drivers may experience a sense of fatigue due to frequent operations of an accelerator pedal and a brake pedal in low-speed situations, such as extremely congested sections during rush hours, drive-through fast-food restaurants, and the like. To solve this problem, advanced smart cruise control (ASCC) technology may be used. However, high-priced radar equipment has to be added to apply the ASCC technology.

The present disclosure has been made to solve the above-mentioned problems and other problems.

An aspect of the present disclosure provides a creep torque control apparatus and method for variably controlling a creep torque in an environmentally-friendly vehicle in consideration of rolling resistance of the vehicle.

Another aspect of the present disclosure provides a creep torque control apparatus and method for measuring a vehicle-to-vehicle distance by using an ultrasonic sensor, which is used in an existing smart parking assist system (SPAS), without additional hardware and variably controlling a creep torque in an environmentally-friendly vehicle in consideration of the measured vehicle-to-vehicle distance.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a creep torque in an environmentally-friendly vehicle includes a user interface that generates a creep cruise control function setup signal or a creep cruise control function disabling signal, detectors that detect driving-related information of the vehicle, and a controller that calculates rolling resistance based on the driving-related information if the creep cruise control function setup signal is received, and variably controls the creep torque in consideration of the calculated rolling resistance depending on whether the vehicle satisfies a creep cruise control operating condition.

The detectors may include a distance detector that detects a distance from another vehicle located in front of the vehicle in a progress direction, a pedal operation detector that detects whether an accelerator pedal and a brake pedal are operated, an inclination angle detector that detects an inclination angle of a road on which the vehicle travels, a speed detector that detects a vehicle speed of the vehicle, and a steering angle detector configured to detect a steering angle of the vehicle.

The distance detector may detect the distance from the other vehicle through one or more ultrasonic sensors.

The pedal operation detector may detect whether the accelerator pedal and the brake pedal are operated, through an accelerator pedal sensor and a brake pedal sensor.

The inclination angle detector may detect the inclination angle of the road through an acceleration sensor.

The controller may calculate the rolling resistance based on the inclination angle and the vehicle speed.

The controller may determine whether the creep cruise control operating condition is satisfied, based on the distance from the other vehicle, the vehicle speed, the steering angle, whether the accelerator pedal and the brake pedal are operated, and the rolling resistance.

The controller may determine whether the creep cruise control operating condition is satisfied, by determining whether the vehicle is able to be stopped within the distance from the other vehicle by only the rolling resistance.

The controller may determine whether there is no operation of the brake pedal and the accelerator pedal and may determine whether the steering angle is smaller than or equal to a reference steering angle.

The controller may determine whether the distance from the other vehicle is shorter than a reference vehicle-to-vehicle distance, in a case where the vehicle satisfies the creep cruise control operating condition.

The controller may variably control the creep torque in consideration of the calculated rolling resistance if the distance from the other vehicle is shorter than the reference vehicle-to-vehicle distance.

The controller may control the creep torque with reference to a mapping table if the distance from the other vehicle is longer than or equal to the reference vehicle-to-vehicle distance.

According to another aspect of the present disclosure, a method for controlling a creep torque in an environmentally-friendly vehicle includes detecting driving-related information through detectors mounted in the vehicle if a creep cruise control function is set up, calculating rolling resistance based on the driving-related information, determining whether the vehicle satisfies a creep cruise control operating condition, based on the driving-related information and the rolling resistance, and variably controlling the creep torque in consideration of the rolling resistance if the vehicle satisfies the creep cruise control operating condition.

The detecting of the driving-related information may include detecting a distance from another vehicle located in front of the vehicle in a progress direction, whether an accelerator pedal and a brake pedal are operated, a road inclination angle, a vehicle speed, and a steering angle.

The determining of whether the vehicle satisfies the creep cruise control operating condition may include determining whether the vehicle is able to be stopped within the distance from the other vehicle by only the rolling resistance.

The variably controlling of the creep torque may include determining whether the distance from the other vehicle is shorter than a reference vehicle-to-vehicle distance, if the vehicle satisfies the creep cruise control operating condition, and variably controlling the creep torque in consideration of the rolling resistance if the distance from the other vehicle is shorter than the reference vehicle-to-vehicle distance.

The method may further include controlling the creep torque with reference to a mapping table if the distance from the other vehicle is longer than or equal to the reference vehicle-to-vehicle distance.

The method may further include disabling the creep cruise control function if the vehicle does not satisfy the creep cruise control operating condition.

According to embodiments of the present disclosure, by variably controlling the creep torque in consideration of the rolling resistance of the vehicle, it is possible to remove frequent operations of the accelerator pedal and the brake pedal in low-speed situations, thereby enhancing user convenience and improving fuel efficiency.

In addition, according to embodiments of the present disclosure, by measuring the vehicle-to-vehicle distance using the ultrasonic sensor, which is used in an existing smart parking assist system (SPAS), without additional hardware and variably controlling the creep torque in consideration of the measured vehicle-to-vehicle distance, it is unnecessary to add high-priced equipment (hardware), thereby preventing an increase in cost.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
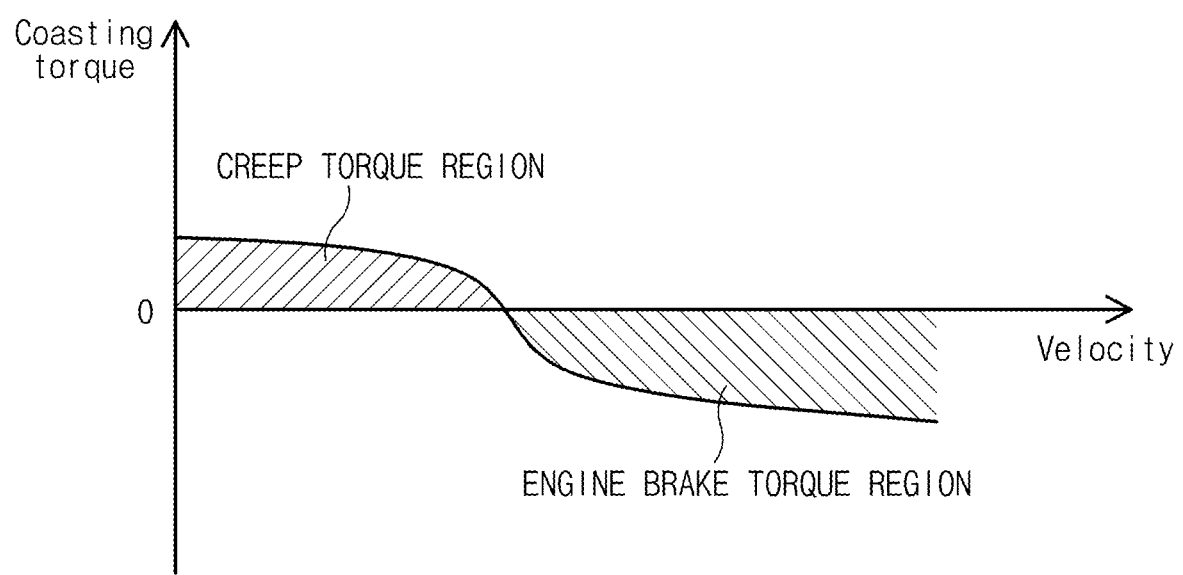
FIG. 1 is a graph illustrating coasting torque according to velocity.

Hereinafter, embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Furthermore, unless otherwise defined, all terms (including technical and scientific terms) used herein have the same meaning as commonly understood by those skilled in the art to which the present disclosure belongs. Terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a creep cruise control (CCC). The creep cruise control is a technology for simulating creep driving by controlling a creep torque in a way of stopping an engine (Idle stop & go) and driving a motor.

An aspect of the present invention provides a system and method for creep cruise control of a hybrid or electric vehicle. When the driver releases a brake pedal of the vehicle, a controller of the vehicle controls a wheel-driving motor to make the vehicle move forward even without an input on an acceleration pedal (creep driving). In embodiments, for a creep driving, a combustion engine does not operate to move the vehicle forward. In embodiments, a creep driving is automatically activated in response to a release all brake pedal or is activated manually by the driver's separate input on a switch or lever.

Subsequent to activation of a creep driving mode, the controller determines a first distance (FIG. 7, $d_{detect}$) between the subject vehicle and the vehicle in front. The controller determines whether the first distance ($d_{detect}$) is greater than a reference distance ($d_{ref}$) prior to determining a target creep torque for controlling the wheel-driving motor.

In embodiments, when it is determined that the first distance ($d_{detect}$) is greater than the reference distance ($d_{ref}$), the controller determines a target creep torque (coasting torque) using a predetermined speed-torque profile (table, map) and controls the wheel-driving motor to generate the target creep torque. In embodiments, the controller does not consider a current rolling resistance of the vehicle to determine the creep torque when using the predetermined speed-torque profile. In embodiments, when the controller uses a profile illustrated in FIG. 3B, the vehicle would reach a terminal speed (10 km/h) of creep driving where the creep torque and the rolling resistance are balanced.

Figure 7:
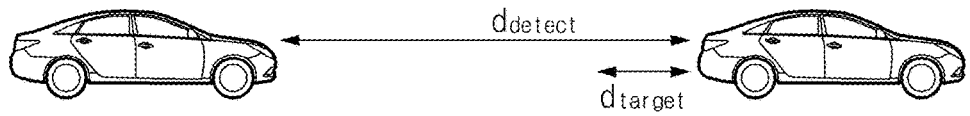
Figure 7:
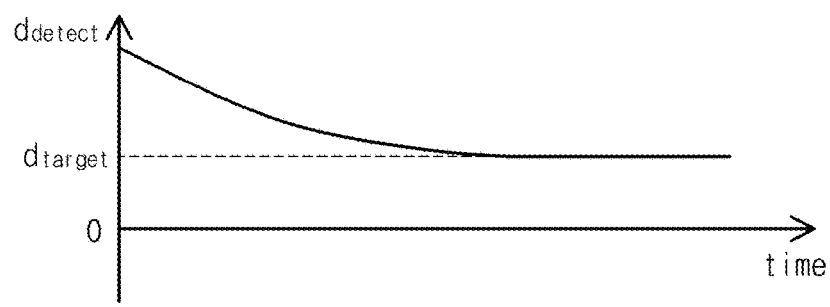
Figure 7:
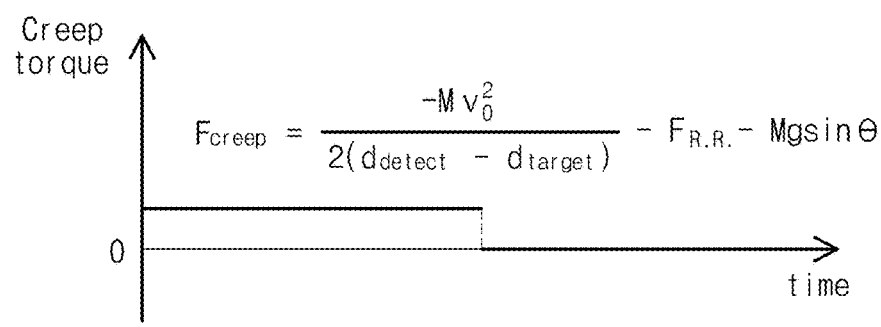
Figure 7:
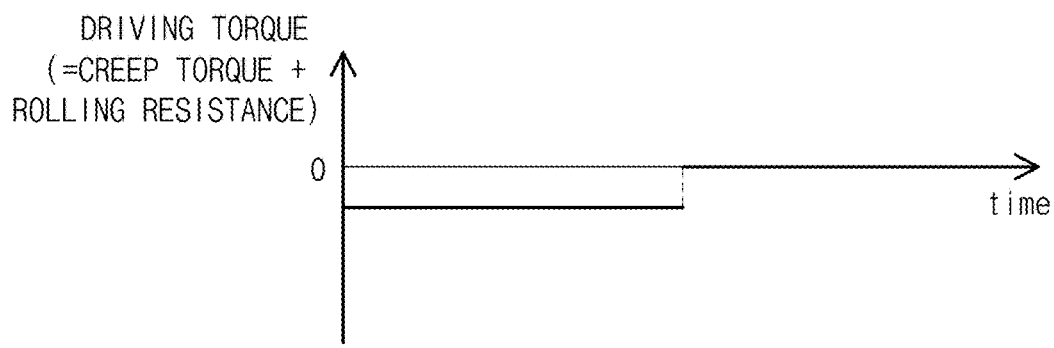

In embodiments, when it is determined that the first distance ($d_{detect}$) is less than the reference distance ($d_{ref}$), the controller computes a target creep torque, and controls the wheel-drive motor to maintain the target creep torque until the vehicle reaches a target distance ($d_{target}$) from the vehicle in front such that the vehicle stops at the target distance from the vehicle in front as illustrated in the distance profile of FIG. 7. In embodiments, the controller computes the target creep torque using the Equation 6 shown in FIG. 7.

FIG. 1 is a graph illustrating coasting torque according to velocity.

Coasting torque may be generated when a driver does not operate a brake pedal and an accelerator pedal. As illustrated in FIG. 1, the coasting torque may be divided into creep torque and engine brake torque. The creep torque may be generated since an idle torque of an engine is delivered to a torque converter in a low-speed situation. The engine brake torque may be generated since an engine RPM has to be higher than an idle RPM in a high-speed situation.

Since an environmentally-friendly vehicle is driven by a motor at a low speed and an engine clutch is released even during high-speed coasting, the coasting has to be simulated through the motor. In this case, creep torque has only positive (+) values as in the graph of FIG. 1. Accordingly, the creep torque may be reduced by rolling resistance of the vehicle.

Figure 2:
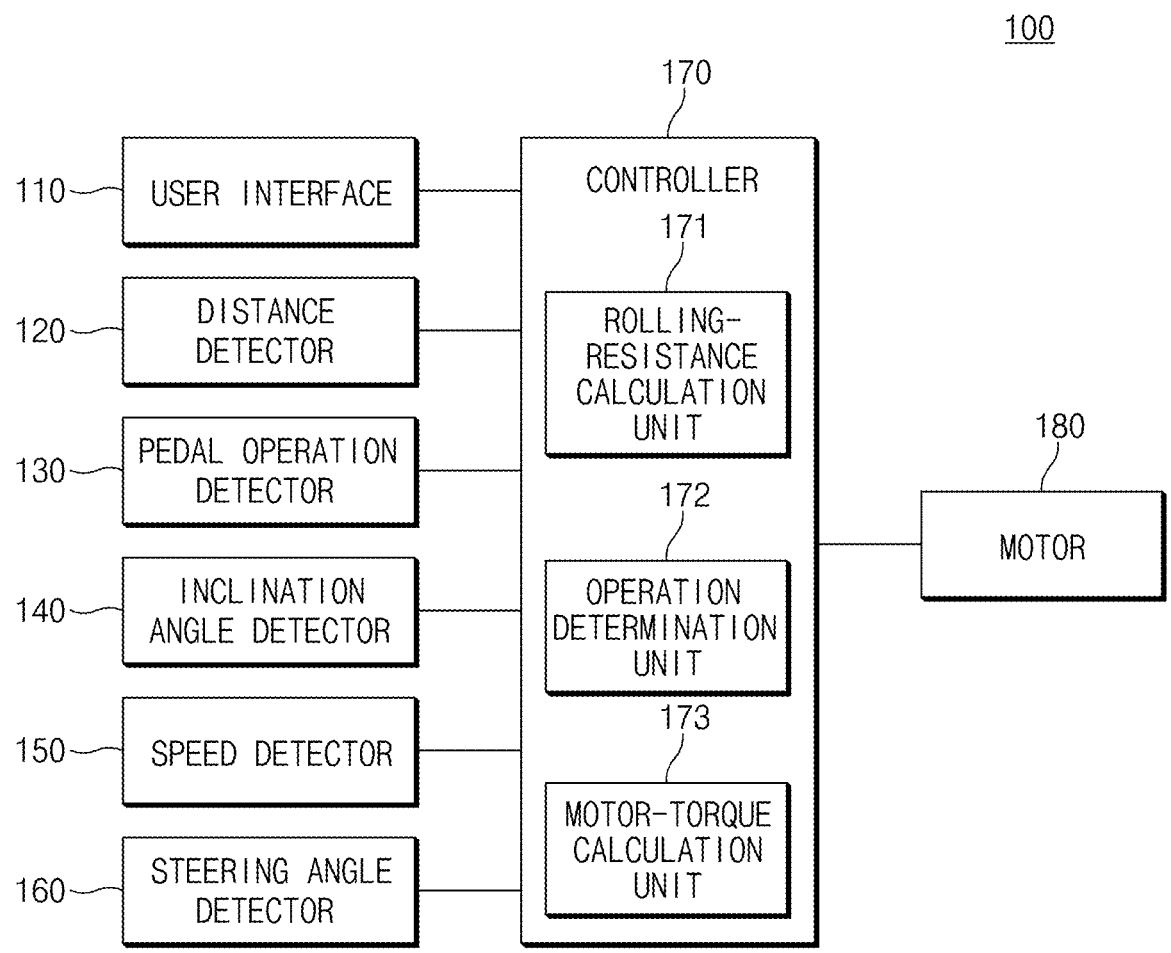
FIG. 2 is a block diagram of a creep torque control apparatus of an environmentally-friendly vehicle according to an embodiment of the present disclosure.
Figure 3A:
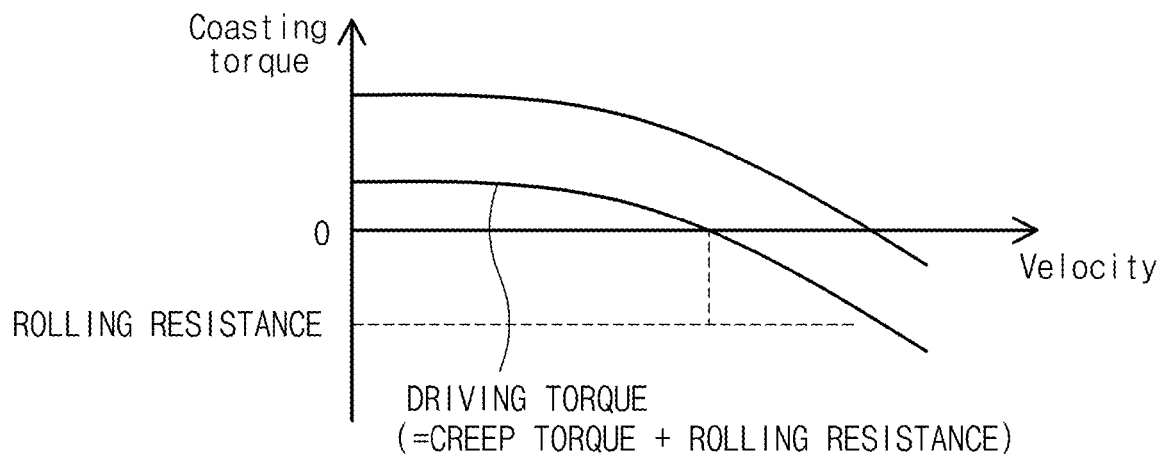
FIGS. 3A to 3C are views for explaining a relation between rolling resistance, creep torque, and driving torque.
Figure 3B:
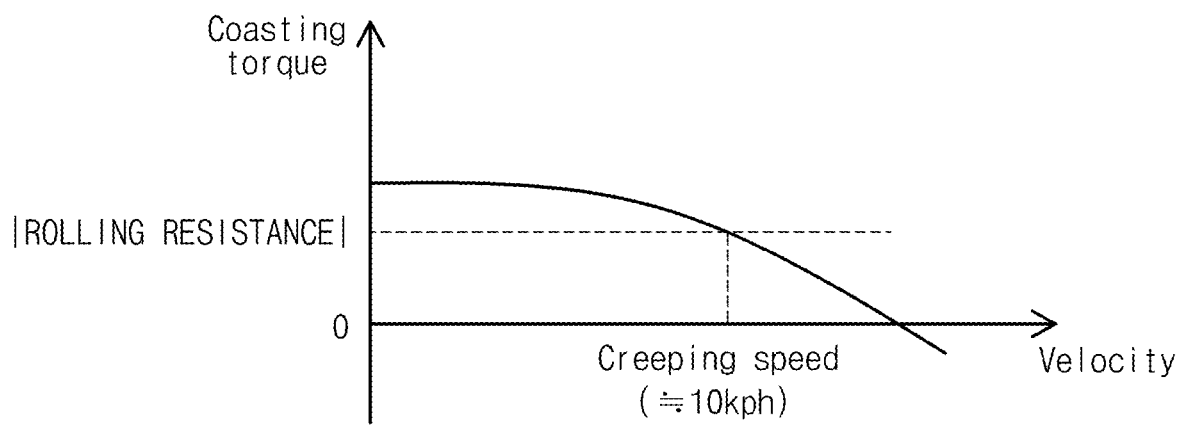
Figure 3C:
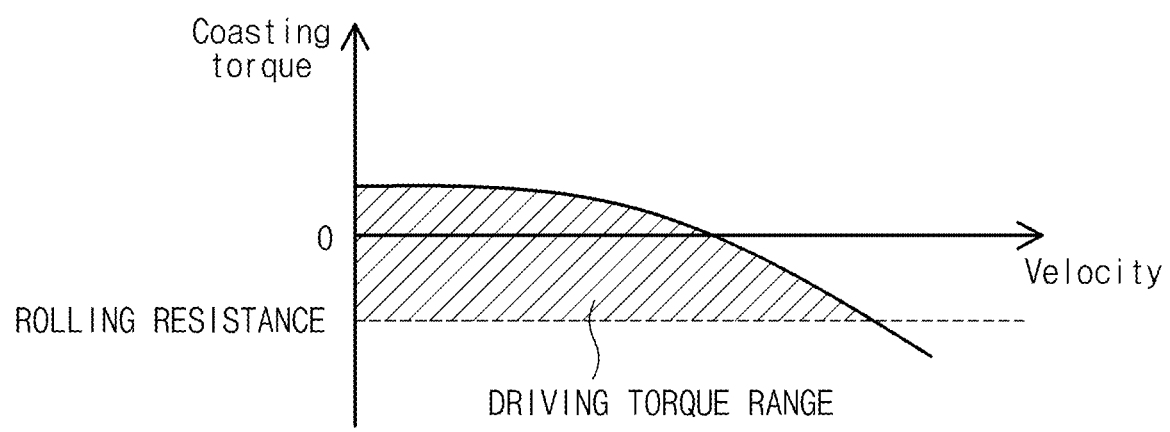
Figure 4:
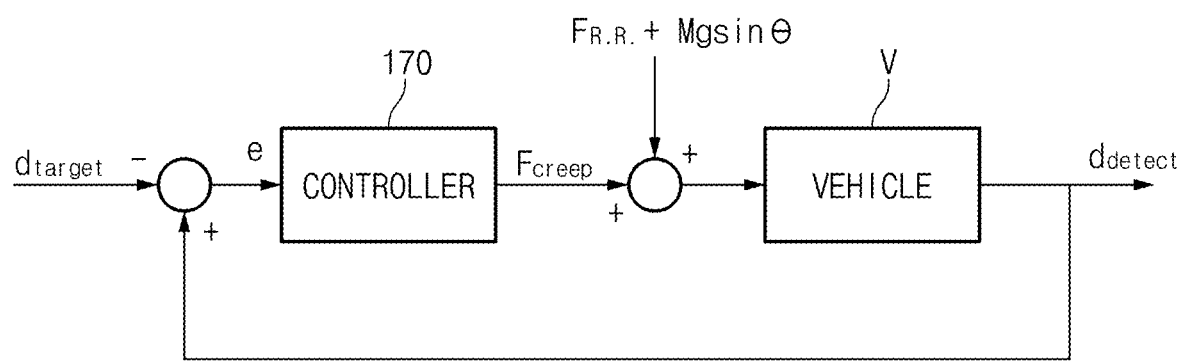
FIG. 4 is a view for explaining vehicle-to-vehicle distance control through a creep torque variation according to embodiments of the present disclosure.

FIG. 2 is a block diagram of a creep torque control apparatus of an environmentally-friendly vehicle according to an embodiment of the present disclosure. FIGS. 3A to 3C are views for explaining a relation between rolling resistance, creep torque, and driving torque. FIG. 4 is a view for explaining vehicle-to-vehicle distance control through a creep torque variation according to embodiments of the present disclosure.

As illustrated in FIG. 2, a creep torque control apparatus 100 may include a user interface 110, a distance detector 120, a pedal operation detector 130, an inclination angle detector 140, a speed detector 150, a steering angle detector 160, a controller 170, and a motor 180.

The user interface 110 may generate data in response to a user operation. The user interface 110 may be implemented with a dome switch, a toggle switch, a touch button, or the like.

A user may operate the user interface 110 to set up or disable a creep cruise control (CCC) function. The user interface 110 may generate a CCC function setup signal or a CCC function disabling signal according to the user operation.

The distance detector 120 may measure the distance from another vehicle in front of and/or behind the vehicle. The distance detector 120 may be implemented with one or more ultrasonic sensor(s). For example, four to six ultrasonic sensors may be mounted on a front bumper and a rear bumper of the vehicle.

In the present disclosure, the distance detector 120 may measure the distance from another vehicle located in front of the vehicle in a progress direction. For example, if the vehicle is moving forward, the distance detector 120 may measure the distance from a vehicle ahead. Meanwhile, if the vehicle is moving backward, the distance detector 120 may measure the distance from a vehicle behind the vehicle. In this case, the progress direction of the vehicle may be identified through a gear position sensor.

The pedal operation detector 130 may detect whether an accelerator pedal and/or a brake pedal is operated. The pedal operation detector 130 may detect whether a driver operates the pedals, through an accelerator pedal sensor (APS) and a brake pedal sensor (BPS).

The inclination angle detector 140 may measure the inclination angle θ of a road on which the vehicle is located (travelling). The inclination angle detector 140 may measure the road inclination angle by using an acceleration sensor.

The speed detector 150 may detect the speed of the vehicle (vehicle speed). The speed detector 150 may calculate the vehicle speed by using vehicle position and time information obtained through a global positioning system (GPS). Alternatively, the speed detector 150 may measure the vehicle speed through a speed sensor mounted in the vehicle.

The steering angle detector 160 may measure (detect) a steering angle (a rotation angle of a steering wheel) through a steering angle sensor configured to detect rotation of the steering wheel.

The controller 170 may detect information relating to driving of the vehicle (driving-related information) through the detectors 120 to 160 if a CCC function setup signal is input from the user interface 110. The controller 170 may calculate rolling resistance based on the driving-related information and may determine whether to operate CCC. If the controller 170 determines to operate the CCC, the controller 170 may determine whether the distance from another vehicle located in front of the vehicle in a progress direction is shorter than a reference vehicle-to-vehicle distance. If the distance between the vehicles is shorter than the reference vehicle-to-vehicle distance, the controller 170 may variably control a creep torque in consideration of the calculated rolling resistance. Meanwhile, if the distance between the vehicles is longer than or equal to the reference vehicle-to-vehicle distance, the controller 170 may control a creep torque by using an existing control method. The creep torque may refer to a motor torque during creep driving.

The controller 170 may be implemented with an electronic control unit (ECU), a hybrid control unit (HCU), or a motor control unit (MCU). The controller 170 may have an internal or external memory. The memory may store driving-related information, rolling resistance, a mapping table, various types of setup information, and the like.

The controller 170 may include a rolling-resistance calculation unit 171, an operation determination unit 172, and a motor-torque calculation unit 173.

The rolling-resistance calculation unit 171 may calculate rolling resistance by using a road inclination angle and a vehicle speed. Rolling resistance measured in advance may vary depending on the state or deterioration of the vehicle. Accordingly, the rolling resistance may be corrected for vehicle distance control.

Generally, in Coulomb friction, a stationary object starts to move when the object overcomes the maximum static friction force, and thereafter the kinetic friction force has a lower value than the maximum static friction force. Accordingly, if the vehicle's behavior is observed immediately after a movement of the vehicle, the rolling resistance may be corrected through an equation of motion for the vehicle. The rolling-resistance calculation unit 171 may correct rolling resistance $F_{R.R.}$ by using Equation 1 below.

$$F_{R.R} = Ma - F_{creep} - Mg \sin \theta \quad \text{[Equation 1]}$$

In Equation 1, M denotes the mass of the vehicle, a denotes the acceleration of the vehicle, $F_{creep}$ denotes a creeping force generated by a creep torque, g denotes the acceleration of gravity, and θ denotes a road inclination angle.

The rolling-resistance calculation unit 171 may update the rolling resistance stored in the memory to the calculated rolling resistance.

The operation determination unit 172 may determine whether to operate a CCC function if receiving a CCC function setup signal. In this case, to determine whether to operate the CCC function, the operation determination unit 172 may determine whether the vehicle is able to be completely stopped within the vehicle-to-vehicle distance detected (sensed) through the distance detector 120 by only the rolling resistance output from the rolling-resistance calculation unit 171. Here, the detected vehicle-to-vehicle distance may refer to the distance from another vehicle located in front of the vehicle in a progress direction.

In general, the acceleration of the vehicle may be obtained by Equation 2 below.

$$Ma = F_{traction} + F_{aero} + F_{R.R.} + Mg\sin\theta \quad \text{[Equation 2]}$$

In Equation 2, $F_{traction}$ denotes a driving force, $Mg\sin\theta$ denotes gradient resistance, and $F_{aero}$ denotes air resistance (equivalent longitudinal drag force).

In the case of performing CCC, Equation 2 may be simplified into Equation 3 since the CCC is limited to a low-speed situation so that air resistance may be negligible and there is no propulsive force caused by an accelerator pedal input.

$$Ma = F_{creep} + F_{R.R.} + Mg\sin\theta \quad \text{[Equation 3]}$$

The vehicle has to be able to maintain a creeping speed between a detectable distance $d_{spec}$ of an ultrasonic sensor and a target vehicle-to-vehicle distance (target distance) $d_{target}$ and then be completely stopped by only rolling resistance. Therefore, an operating condition has to satisfy Equation 5 in accordance with an acceleration-travel distance-velocity relation (Equation 4).

$$2as = v^2 - v_0^2 \quad \text{[Equation 4]}$$

$$\frac{F_{R.R.} + Mg\sin\theta}{M} = a < \frac{-v_{creeping}^2}{2(d_{spec} - d_{target})} \quad \text{[Equation 5]}$$

In Equation 5, s denotes a travel distance, $v_o$ denotes the original velocity, v (=0) denotes the final velocity, and $v_{creeping}$ denotes a creeping speed. The creeping speed, which is a vehicle speed when creep torque is equivalent to rolling resistance, may be about 10 kilometer per hour (kph).

Furthermore, in the case of a large steering angle, a vehicle located in front of the vehicle in a progress direction may not be detected, and therefore the steering angle has to be limited in consideration of the measurement range of an ultrasonic sensor. For example, if the ultrasonic sensor is able to make a measurement in the range of 30 degrees, the steering angle may be limited to 15 degrees or less in a left-right direction.

Operating conditions may be summarized as follows in view of the above matters.

1) a case where the inclination angle of a road on which the vehicle travels (the road inclination angle) is smaller than or equal to a reference inclination angle
2) a case where a steering angle is smaller than or equal to a reference steering angle
3) a case where a brake pedal and an accelerator pedal are not operated
4) a case where calculated rolling resistance is higher than or equal to reference rolling resistance
5) a case where a vehicle speed is lower than or equal to a reference vehicle speed Here, the reference inclination angle, the reference rolling resistance, and the reference vehicle speed may be determined to satisfy Equation 5 above. Further, the reference steering angle may be determined by the specification of the steering angle sensor.

The operation determination unit 172 may determine whether the vehicle satisfies the aforementioned operating conditions. If the vehicle satisfies all of the five operating conditions, the operation determination unit 172 may determine to operate CCC.

If the rolling resistance calculated by the rolling-resistance calculation unit 171 and the road inclination angle and the vehicle speed detected by the detectors 140 and 150 satisfy Equation 5, the operation determination unit 172 may determine that the vehicle is able to be completely stopped within the detected vehicle-to-vehicle distance by only the calculated rolling resistance. That is, if the road inclination angle is smaller than or equal to the reference inclination angle, the calculated rolling resistance is higher than or equal to the reference rolling resistance, and the vehicle speed is lower than or equal to the reference vehicle speed, the operation determination unit 172 may determine that the vehicle is able to be completely stopped within the detected vehicle-to-vehicle distance by only the calculated rolling resistance.

Meanwhile, if the vehicle does not satisfy one or more of the five operating conditions, the operation determination unit 172 may disable the CCC function. At this time, the operation determination unit 172 may output a notification to notify of the disabling of the CCC function by using visual and/or auditory information.

The motor-torque calculation unit 173 may determine whether a vehicle-to-vehicle distance $d_{detect}$ detected by the distance detector 120 is shorter than a reference vehicle-to-vehicle distance $d_{ref}$. If the detected vehicle-to-vehicle distance $d_{detect}$ is shorter than the reference vehicle-to-vehicle distance $d_{ref}$, the motor torque calculation unit 173 may control the vehicle-to-vehicle distance by variably controlling a creep torque in consideration of the calculated rolling resistance. Meanwhile, if the detected vehicle-to-vehicle distance $d_{detect}$ is longer than or equal to the reference vehicle-to-vehicle distance $d_{ref}$, the motor torque calculation unit 173 may perform existing creeping control.

If the detected vehicle-to-vehicle distance $d_{detect}$ is longer than or equal to the reference vehicle-to-vehicle distance $d_{ref}$, the motor torque calculation unit 173 may calculate a motor torque for generating a creep torque according to the detected vehicle speed, with reference to the mapping table stored in the memory in advance. Here, the mapping table may be a table obtained by measuring a creep torque naturally generated in an automatic transmission vehicle having an internal combustion engine according to a vehicle speed and mapping the measured creep torque onto the vehicle speed.

If the detected vehicle-to-vehicle distance $d_{detect}$ is shorter than the reference vehicle-to-vehicle distance $d_{ref}$, the motor torque calculation unit 173 may control a creeping force $F_{creep}$ through Equation 6. In this case, the vehicle may move at a predetermined acceleration to stop at a point spaced a target distance $d_{target}$ apart from the vehicle in front of the vehicle in the progress direction.

$$F_{creep} = \frac{-Mv_0^2}{2(d_{detect} - d_{target})} - F_{R.R.} - Mg\sin\theta \quad \text{[Equation 5]}$$

The motor torque calculation unit 173 may calculate a driving torque for driving the motor 180 in consideration of a tire radius, a gear ratio, and the like, in addition to the calculated creeping force $F_{creep}$. In this case, the creep torque may not have a negative (−) value, but the driving torque may have a negative (−) value on account of the rolling resistance of the vehicle.

As illustrated in FIG. 3A, the final driving torque output by vehicle wheels may be calculated as the sum of the creep torque and the rolling resistance. As illustrated in FIG. 3B, when the creep torque is equal to the absolute value of the rolling resistance, the driving torque may be 0 Nm, and the vehicle speed at this time may be referred to as a creeping speed. Accordingly, the vehicle may travel at a constant creeping speed of about 10 kph. In the case of actively controlling the driving torque irrespective of the vehicle speed, the driving torque may have a driving torque range illustrated in FIG. 3C. Accordingly, even though the creep torque is positive (+), the driving torque obtained by adding the creep torque to the rolling resistance may be negative (−), and thus the vehicle may decelerate.

As illustrated in FIG. 4, the controller 170 may calculate a creeping force by applying, to Equation 6, the difference e between the vehicle-to-vehicle distance $d_{detect}$ measured by the distance detector 120 and the target distance $d_{target}$. In the case of controlling the creeping force as described above, the vehicle V may travel at a predetermined acceleration to stop at a point spaced the target distance $d_{target}$ apart from the vehicle in front of the vehicle in the progress direction. That is, the controller 170 may control the vehicle speed at a predetermined acceleration to control the distance from the vehicle ahead.

The motor 180 may generate power under control of the controller 170 to drive the vehicle V. The motor 180 may be driven by the motor torque calculated by the motor torque calculation unit 173 of the controller 170.

Figure 5:
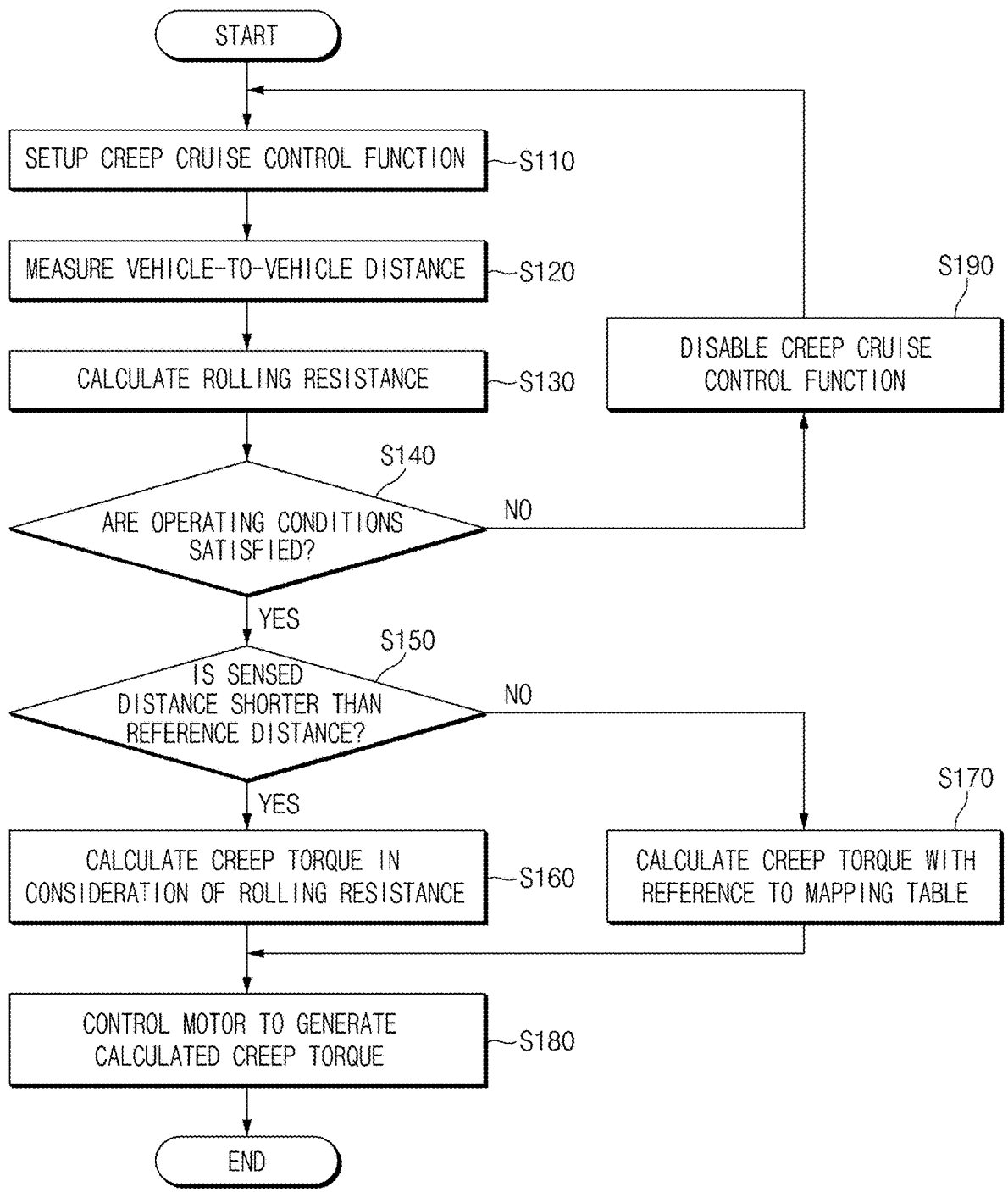
FIG. 5 is a flowchart illustrating a method for controlling a creep torque in an environmentally-friendly vehicle according to an embodiment of the present disclosure.

FIG. 5 is a flowchart illustrating a method for controlling a creep torque in an environmentally-friendly vehicle according to an embodiment of the present disclosure.

The controller 170 may set up a creep cruise control (CCC) function in response to user input data transferred from the user interface 110 (Step S110). For example, if a user operates a button of the user interface 110 to which a function of setting up and disabling the CCC function is assigned, the controller 170 may set up (activate) or disable (deactivate) the CCC function in response to the user operation of the button.

If the CCC function is set up, the controller 170 may measure, through the distance detector 120, the distance from another vehicle located in front of the vehicle in a progress direction (Step S120). If a CCC function setup signal is input from the user interface 110, the controller 170 may detect vehicle-related information through the detectors 120 to 160.

The controller 170 may calculate rolling resistance of the vehicle by using the road inclination angle measured by the inclination angle detector 140 and the vehicle speed detected by the speed detector 150 (Step S130). The controller 170 may calculate the rolling resistance by using Equation 1.

The controller 170 may determine whether the vehicle satisfies operating conditions for the CCC function (Step S140). In other words, the controller 170 may determine whether the vehicle is able to be completely stopped within the measured vehicle-to-vehicle distance by only the calculated rolling resistance, based on the vehicle-to-vehicle distance, the road inclination angle, and the vehicle speed detected by the distance detector 120, the inclination angle detector 140, and the speed detector 150. Further, the controller 170 may determine whether a driver operates the brake pedal and the accelerator pedal, through the pedal operation detector 130 and may determine whether the steering angle measured by the steering angle detector 160 is smaller than or equal to a reference steering angle.

In the case where the vehicle satisfies the operating conditions, the controller 170 may determine whether the vehicle-to-vehicle distance $d_{detect}$ detected (measured) by the distance detector 120 is shorter than the reference vehicle-to-vehicle distance $d_{ref}$ (Step S150).

If the measured vehicle-to-vehicle distance $d_{detect}$ is shorter than the reference vehicle-to-vehicle distance $d_{ref}$, the controller 170 may calculate a creep torque in consideration of the rolling resistance (Step S160). In other words, the controller 170 may calculate a creeping force in consideration of the difference between the detected vehicle-to-vehicle distance $d_{detect}$ and the target distance $d_{target}$. Further, the controller 170 may calculate a motor torque in consideration of a tire radius, a gear ratio, and the like, in addition to the calculated creeping force.

If the measured vehicle-to-vehicle distance $d_{detect}$ is longer than or equal to the reference vehicle-to-vehicle distance $d_{ref}$, the controller 170 may calculate a creep torque with reference to a mapping table (Step S170). In other words, the controller 170 may calculate a motor torque for generating a creep torque according to the vehicle speed, which has been detected by the speed detector 150, with reference to the mapping table (Step S170).

The controller 170 may control the motor 180 to generate the calculated creep torque (Step S180). That is, the controller 170 may drive the motor 180 by using the calculated motor torque.

Meanwhile, if the vehicle does not satisfy the operating conditions, the controller 170 may disable the CCC function (Step S190). In this case, the controller 170 may display a notification on a display, or may output the notification through a speaker, to notify of the disabling of the CCC function. Alternatively, the controller 170 may output the corresponding notification through the display and the speaker.

Figure 6:
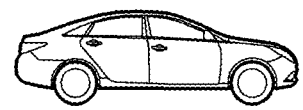
FIGS. 6 and 7 are views for explaining creep torque control according to embodiments of the present disclosure.
Figure 6:
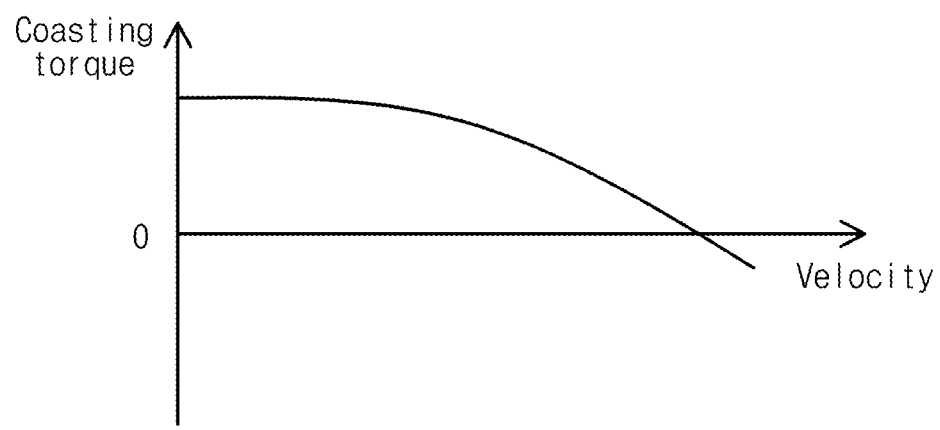

FIGS. 6 and 7 are views for explaining creep torque control according to embodiments of the present disclosure.

As illustrated in FIG. 6, in the case where there is no vehicle in front of a vehicle moving forward, the controller 170 may control a creep torque based on a mapping table (a speed-coasting torque map). That is, the controller 170 may control the creep torque depending on the detected vehicle speed.

If the distance $d_{detect}$ between the vehicle and a vehicle ahead is shorter than the reference vehicle-to-vehicle distance $d_{ref}$, the vehicle speed has to be 0 kph at the point where the vehicle-to-vehicle distance $d_{detect}$ is equal to the target distance $d_{target}$. Accordingly, as illustrated in FIG. 7, creep torque control may be performed to linearly decrease the vehicle speed to make the vehicle speed equal to 0 kph when the vehicle-to-vehicle distance $d_{detect}$ reaches the target distance $d_{target}$. In this case, proportional integral derivative (PID) control may be applied to the torque control.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although the present disclosure has been described with reference to embodiments and the accompanying drawings, the present disclosure is not limited thereto, but may be variously modified and altered by those skilled in the art to which the present disclosure pertains without departing from the spirit and scope of the present disclosure.

Therefore, embodiments of the present disclosure are provided to explain the spirit and scope of the present disclosure, but not to limit them, so that the spirit and scope of the present disclosure is not limited by the embodiments. The scope of the present disclosure can be construed on the basis of the claims, and all the technical ideas within the scope equivalent to the original claims are included in the scope of the present disclosure.

What is claimed is:

1. An apparatus for controlling a creep torque in an environmentally-friendly vehicle, the apparatus comprising:
a user interface configured to generate a creep cruise control function setup signal or a creep cruise control function disabling signal:
detectors configured to detect driving-related information of the vehicle, wherein the detectors include a distance detector configured to detect a distance from another vehicle located in front of the vehicle in a progress direction; and
a controller configured to
calculate rolling resistance based on the driving-related information if the creep cruise control function setup signal is received;
determine whether the distance from the other vehicle is shorter than a reference vehicle-to-vehicle distance, in a case where the vehicle satisfies the creep cruise control operating condition; and
variably control the creep torque in consideration of the calculated rolling resistance if the distance from the other vehicle is shorter than the reference vehicle-to-vehicle distance.

2. The apparatus of claim 1, wherein the detectors include:
a pedal operation detector configured to detect whether an accelerator pedal and a brake pedal are operated;
an inclination angle detector configured to detect an inclination angle of the road on which the vehicle travels;
a speed detector configured to detect a vehicle speed of the vehicle; and
a steering angle detector configured to detect a steering angle of the vehicle.

3. The apparatus of claim 2, wherein the distance detector is configured to detect the distance from the other vehicle through one or more ultrasonic sensors.

4. The apparatus of claim 2, wherein the pedal operation detector is configured to detect whether the accelerator pedal and the brake pedal are operated, through an accelerator pedal sensor and a brake pedal sensor.

5. The apparatus of claim 2, wherein the inclination angle detector is configured to detect the inclination angle of the road through an acceleration sensor.

6. The apparatus of claim 2 wherein the controller is configured to determine whether the creep cruise control operating condition is satisfied, based on the distance from the other vehicle, the vehicle speed, the steering angle, whether the accelerator pedal and the brake pedal are operated, and the rolling resistance.

7. The apparatus of claim 6, wherein the controller is configured to determine whether the creep cruise control operating condition is satisfied, by determining whether the vehicle is able to be stopped within the distance from the other vehicle by only the rolling resistance.

8. The apparatus of claim 7, wherein the controller is configured to determine whether there is no operation of the brake pedal and the accelerator pedal and to determine whether the steering angle is smaller than or equal to a reference steering angle.

9. The apparatus of claim 1, wherein the controller is configured to control the creep torque with reference to a mapping table if the distance from the other vehicle is longer than or equal to the reference vehicle-to-vehicle distance.

10. A method for controlling a creep torque in an environmentally-friendly vehicle, the method comprising:
detecting driving-related information through detectors mounted in the vehicle if a creep cruise control function is set up, wherein the driving-related information includes a distance from another vehicle located in front of the vehicle in a progress direction;
calculating rolling resistance based on the driving-related information;
determining whether the vehicle satisfies a creep cruise control operating condition, based on the driving-related information and the rolling resistance;
determining whether the distance from the other vehicle is shorter than a reference vehicle-to-vehicle distance if the vehicle satisfies the creep cruise control operating condition; and
variably controlling the creep torque in the consideration of the rolling resistance if the distance from the other vehicle is shorter than the reference vehicle-to-vehicle distance.

11. The method of claim 10, wherein the detecting of the driving-related information includes:
detecting whether an accelerator pedal and a brake pedal are operated, a road inclination angle, a vehicle speed, and a steering angle.

12. The method of claim 11, wherein the determining of whether the vehicle satisfies the creep cruise control operating condition includes:
determining whether the vehicle is able to be stopped within the distance from the other vehicle by only the rolling resistance.

13. The method of claim 11, further comprising:
disabling the creep cruise control function if the vehicle does not satisfy the creep cruise control operating condition.

14. The method of claim 10, further comprising:
controlling the creep torque with reference to a mapping table if the distance from the other vehicle is longer than or equal to the reference vehicle-to-vehicle distance.

* * * * *